(12) United States Patent
Parra Navarrete et al.

(10) Patent No.: US 8,282,819 B2
(45) Date of Patent: Oct. 9, 2012

(54) FILTER DEVICE WITH A HEATER

(75) Inventors: Alberto Parra Navarrete, Madrid (ES); Alfonso Baz, Las Matas (ES); Bernhard Hager, Puch (ES); Carlos J. Blasco Remacha, Azuqueca de Henares (ES); Volker Brielmann, Frieberg am Neckar (ES); Leopold Bernegger, Adnet (AT)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/063,751

(22) PCT Filed: Jul. 31, 2006

(86) PCT No.: PCT/EP2006/064837
§ 371 (c)(1),
(2), (4) Date: Apr. 21, 2010

(87) PCT Pub. No.: WO2007/020179
PCT Pub. Date: Feb. 22, 2007

(65) Prior Publication Data
US 2010/0200485 A1 Aug. 12, 2010

(30) Foreign Application Priority Data

Aug. 16, 2005 (DE) .......................... 10 2005 038 536
Jul. 24, 2006 (DE) .......................... 10 2006 034 077

(51) Int. Cl.
*B01D 35/18* (2006.01)
*F02M 37/22* (2006.01)
(52) U.S. Cl. .......................... 210/184; 210/149; 210/243
(58) Field of Classification Search .................. None
See application file for complete search history.

(56) References Cited

U.S. PATENT DOCUMENTS

| 1,455,287 | A | * | 5/1923 | Hadley | 219/528 |
| 1,523,156 | A | * | 1/1925 | Adams | 392/479 |
| 1,695,227 | A | * | 12/1928 | Bolinger | 392/479 |
| 1,766,480 | A | * | 6/1930 | Blauvelt | 392/493 |
| 1,990,547 | A | * | 2/1935 | Jancke | 219/222 |
| 2,067,011 | A | * | 1/1937 | Knight | 15/250.08 |
| 2,103,434 | A | * | 12/1937 | Pennebaker | 210/185 |
| 2,224,030 | A | * | 12/1940 | Conboy | 219/265 |
| 2,250,691 | A | * | 7/1941 | Wilson et al. | 392/375 |
| 2,482,665 | A | * | 9/1949 | Geyer | 219/529 |
| 2,527,864 | A | * | 10/1950 | Weidenschilling | 219/535 |
| 2,529,698 | A | * | 11/1950 | Julius | 210/149 |
| 2,543,527 | A | * | 2/1951 | Gyuris | 83/111 |
| 2,553,762 | A | * | 5/1951 | Gyuris | 338/232 |

(Continued)

FOREIGN PATENT DOCUMENTS

DE 196 02 082 7/1997

(Continued)

*Primary Examiner* — Robert James Popovics
(74) *Attorney, Agent, or Firm* — Michael J. Striker

(57) ABSTRACT

Disclosed is a filter device (10), particularly a liquid filter, comprising a filter element (16) that is disposed in a filter housing (12, 14) and a heater (28) for heating medium flowing through the filter device (10). The inventive filter device (10) is characterized in that the heater (28) is designed with at least one heating circuit (30) that is molded into the filter housing (12, 14). Alternatively or additionally, the heater (28) is designed with at least one heating circuit (30) which is provided with an electrical contact (34) in at least one of the final zones thereof, said electrical contact (34) being riveted to the heating circuit (28).

12 Claims, 4 Drawing Sheets

U.S. PATENT DOCUMENTS

| | | | |
|---|---|---|---|
| 2,745,552 A * | 5/1956 | Bruggeman et al. | 210/181 |
| 2,844,698 A * | 7/1958 | Costanzo | 219/270 |
| 2,909,284 A | 10/1959 | Watkins | |
| 3,450,264 A * | 6/1969 | Graybill | 210/137 |
| 4,338,189 A * | 7/1982 | Johnson, Sr. | 210/180 |
| 4,372,260 A * | 2/1983 | Baker | 123/142.5 E |
| 4,404,949 A * | 9/1983 | Bell | 123/557 |
| 4,406,785 A * | 9/1983 | Siefer | 210/186 |
| 4,498,446 A * | 2/1985 | Judson | 123/557 |
| 4,539,108 A * | 9/1985 | Izutani et al. | 210/104 |
| 4,580,542 A * | 4/1986 | Kawabata | 123/557 |
| 4,596,224 A * | 6/1986 | Prager | 123/557 |
| 4,603,244 A * | 7/1986 | Genz | 219/205 |
| 4,844,793 A * | 7/1989 | Izutani et al. | 210/97 |
| 4,866,250 A * | 9/1989 | Pasbrig | 392/479 |
| 5,110,460 A * | 5/1992 | Gilas | 210/149 |
| 5,211,845 A * | 5/1993 | Kaneshige | 210/186 |
| 5,270,521 A | 12/1993 | Shikama et al. | |
| 5,530,225 A * | 6/1996 | Hajaligol | 219/535 |
| 5,896,846 A * | 4/1999 | Bauer et al. | 123/510 |
| 6,137,090 A * | 10/2000 | Dittmar et al. | 219/465.1 |
| 6,177,658 B1 * | 1/2001 | White et al. | 219/535 |
| 6,328,883 B1 * | 12/2001 | Jensen | 210/136 |
| 6,402,943 B1 | 6/2002 | Bohlender | |
| 6,974,537 B2 * | 12/2005 | Abdelqader | 210/86 |
| 6,994,784 B2 * | 2/2006 | Jainek | 210/149 |
| 7,048,851 B2 * | 5/2006 | Decaux | 210/186 |
| 7,215,878 B2 * | 5/2007 | Neumann et al. | 392/390 |
| 7,268,325 B1 * | 9/2007 | Chuang et al. | 219/545 |
| 7,396,473 B1 * | 7/2008 | Guynn | 210/774 |
| 8,038,872 B2 * | 10/2011 | Jokschas et al. | 210/86 |
| 8,057,687 B2 * | 11/2011 | Jainek | 210/767 |
| 2003/0049025 A1 * | 3/2003 | Neumann et al. | 392/390 |
| 2003/0116490 A1 | 6/2003 | Keyster et al. | |
| 2006/0249499 A1 * | 11/2006 | Winkler | 219/202 |
| 2008/0197064 A1 * | 8/2008 | Blasco Remacha et al. | 210/184 |
| 2009/0126705 A1 * | 5/2009 | Trapasso et al. | 123/549 |
| 2010/0193505 A1 * | 8/2010 | Peck | 219/548 |
| 2010/0200485 A1 * | 8/2010 | Parra Navarrete et al. | 210/184 |
| 2010/0258491 A1 * | 10/2010 | Jokschas et al. | 210/181 |
| 2012/0037548 A1 * | 2/2012 | Jokschas et al. | 210/86 |

FOREIGN PATENT DOCUMENTS

| | | |
|---|---|---|
| DE | 102 56 444 | 7/2003 |
| DE | 10 2004 032 6 | 2/2006 |
| DE | 10 2008 043 A1 * | 4/2010 |
| EP | 1 036 930 | 9/2000 |
| EP | 1 158 158 | 11/2001 |
| EP | 1 648 199 | 4/2006 |
| FR | 2 802 245 | 6/2001 |
| GB | 1 568 503 | 5/1980 |
| JP | 02165589 A * | 6/1990 |
| KR | 2001-0063121 | 7/2001 |
| RU | 2 152 532 | 7/2000 |
| WO | 2007/020179 | 2/2007 |
| WO | WO 2007/020179 A1 * | 2/2007 |

* cited by examiner

FILTER DEVICE WITH A HEATER

CROSS-REFERENCE

The invention described and claimed hereinbelow is also described in PCT/EP2006/064837, filed on Jul. 31, 2006, DE 10 2005 038 536.2, filed Aug. 16, 2005 and DE 10 2006 034 077.9, filed Jul. 24, 2006. These German Patent Applications, whose subject matter is incorporated here by reference, provide the basis for a claim of priority of invention under 35 U.S.C. 119 (a)-(d).

BACKGROUND OF THE INVENTION

The invention relates to a filter device, in particular a fluid filter, such as a urea filter or fuel filter, having a filter element that is disposed in a filter housing, and having a heater for heating a medium flowing through the filter device.

In filter devices and in particular in fluid filters under various operating conditions, to ensure uniformly good filtration, it is known to provide a heater on each of the filter devices. With the heater, freezing or flaking of the filtrate, for instance, such as diesel fuel, in cold starting of an associated motor vehicle can be prevented, and a uniformly high throughput of medium through the filter device can be ensured. In urea filters as well, such a heater may be necessary. The heaters used are embodied as electrical PTC (positive temperature coefficient) heaters, which have automatic regulation and are especially adapted to the heating situation to be brought about. The PTC elements are taken into account as separate components within the construction of the filter device and procured accordingly from vendors and installed in the filter device in its assembly. The expense associated with the heaters is considerable.

SUMMARY OF THE INVENTION

The object of the invention is to furnish a filter device in which the aforementioned problems are overcome, and in particular in which high heating capacity can be furnished economically.

This object is attained according to the invention with a filter device in which the heater is embodied with at least one heating track, which is injection-molded in the filter housing.

In contrast to known filter devices, which are provided with PTC elements as heaters, according to the invention, for heating the filter device, a heating track or heating wire or even a heating coil is provided that is also injection-molded into the filter housing of the filter device. With this kind of injection molding, also known as insert-molding, the heating track provided according to the invention can be integrated, during the production of the filter housing, with the wall of the filter housing at comparatively little effort and expense. Accordingly, the logistical effort and expense known from the prior art as well as the assembly effort and expense for a heating element are dispensed with. The heating track of the invention is especially advantageously embodied as a stamped grating, which in a manner similar to known conductor tracks is stamped out by a stamping process from a striplike or sheetlike piece of sheet metal. The stamped grating (especially in the grid portions separate from the actual heater) may also include further electrical functions, such as supplying current to the associated filter device or diverting current from it. The injection-molding process to be provided can build on extensive knowledge and experience with other components that in the most various kinds of technical equipment are now being injection-molded into housings made in particular from plastic. A further advantage of the invention is considered to be that the medium flowing through the filter device, while in the interior of the filter housing it is in the immediate vicinity of the heater, nevertheless does not come into direct contact with the heater. This kind of direct contact is a problem in known filter devices, for instance in filtering a solution of urea and water, since urea already decomposes at approximately 60° C.

It is furthermore an important advantage of the heater of the invention that this heater leads to especially uniform distribution of the thermal energy supplied, beyond the surface area of the heater itself. As a result, local (harmful or unwanted) temperature peaks at the filter housing are avoided. At the same time, the heater of the invention and thus the entire filter device requires especially little installation space, with at the same time high heating output. In particular, the temperature sought in all the essential filter regions is attained quite quickly and largely uniformly.

To create a filter that can be used especially expediently particularly for automotive applications and at the same time to achieve high efficiency of the heater of the invention, it is advantageous to embody the filter housing cylindrically, and to locate the at least one heating track in the jacket portion of the cylindrical filter housing.

The aforementioned advantages with regard to especially good utilization of the heating energy supplied and the creation of an especially demand-responsive temperature profile beyond the surface of the filter housing of the invention can moreover be attained to a particular extent by providing that the at least one heating track is distributed in looplike fashion in the surface of the filter housing.

Alternatively or in addition, the effort and expense for assembly of the filter device of the invention can be kept especially low if the at least one heating track is not injection-molded directly into the filter housing, but instead if it is pre-positioned in a retaining element. With the retaining element, the individual loops of the heating track can be retained relative to one another and in relationship to connection contacts in a defined way. The heating tracks thus retained can then be easily further processed and can for instance also be automatically delivered to an injection molding machine that is provided for injection-molding the heating tracks into the filter housing. The retaining element itself may have been created in an injection-molding process, in which the heating track in particular has been put in place and insert-molded. This insert-molding can be done with injection-molding machines that are arranged especially for the (small-area) insert-molding of the heating track, while injection-molding machines for producing the housing must as a rule meet considerably more-complex demands, for instance with regard to the surface quality of the filter housing produced.

To attain an especially good heat input, fast reaction capability, and high efficiency, it is also advantageous in the filter device of the invention if the at least one heating track is located essentially on the inside of the filter housing. In this arrangement, the heating track is only slightly covered with material comprising the filter housing.

The transfer of thermal energy to the medium flowing through the filter device of the invention can moreover be improved by providing that the filter housing is made from a highly thermally conductive plastic. For generating especially good thermal conductivity, this plastic is advantageously embodied with fillings of aluminum oxide and/or magnesium hydroxide.

Since the heating track housings according the invention (unlike PTC heating elements) are as a rule not self-regulating, these heating tracks should be provided with their own regulator, in the form of a control device for the controlled delivery of electrical energy to the at least one heating track. This kind of control device may be embodied for instance with pulse width modulation or some other electronic circuit with which overheating of the filter device of the invention is reliably prevented.

Finally, in the filter device of the invention, it is especially advantageous if the at least one heating track, on at least one of its end regions, is provided with an electrical contact which is embodied from a different material than the heating track. The electrical contacts can then be used to connect the aforementioned control device, for communication with one or more temperature sensors, and/or for inputting electrical energy.

In the filter device of the invention, the electrical contact is moreover embodied from a different material from the heating track (30). The material comprising the electrical contact may be connected to the heating track in particular by means of a stamping, crimping, or soldering process. This last embodiment makes it possible in particular for a plug, of the kind already available on the market and as rule standardized, to be connected to the heating track of a heater of a filter device. The aforementioned electrical contacts, which are coupled according to the invention to the heating track and embodied from a different material, can in fact be freely selected not only with regard to their shape and size but also with regard to their material and can be adapted accordingly to the specifications of a standardized plug.

The object of the invention is moreover attained with a filter device of the type defined at the outset in which the heater is embodied with at least one heating track, which on at least one of its end regions is embodied with an electrical contact that is welded to the heating track. This embodiment offers considerable advantages, compared to known soldered connections of connection contacts to heating tracks. Such soldered connections are complicated to produce and furthermore involve the risk of being embodied as so-called cold soldered points, which are a familiar problem in terms of quality. Moreover, soldered contact pins have less strength in an ensuing insert-molding operation. This embodiment is also especially advantageous as a refinement of the embodiments of the invention referred to above.

The connection between the heating track and the electrical contact of the invention is especially preferably embodied as a rivetless connection, that is, a rivet connection without a separate rivet. The rivetless connection has the advantage that only two different materials are joined together in a way in which they contact one another. The rivetless connection is therefore not so problematic with regard to contact corrosion as separate connections that have a rivet as a separate component.

Especially preferably, the heating track, in its end region toward the electrical contact, is embodied with at least one opening, into which a projection embodied on the electrical contact is inserted and riveted in rivetless fashion. The connection of this kind can be produced in terms of production technology in an especially safe and economical process. The at least one opening provided according to the invention preferably has an opening cross section of between approximately 0.5 mm and approximately 1.0 mm. The number of riveted points is preferably from two to three.

In these refinements of the invention, the heating track is preferably is produced from a purposefully high-impedance material, and the riveted-on electrical contact is produced from a purposefully low-impedance material. Such different materials for the heating track and the electrical contact are adapted in a purposeful way to the functions assigned to the various elements. For instance, as the material for the electrical contacts, CuSn is preferably selected, while the heating track is conversely especially made from a material with high electrical resistance that can be stamped out especially well.

Finally, to make the additional production effort and expense that initially results with the embodiment of the invention because of the two initially separate components, that is, the heating track and the electrical contact, as slight as possible, the electrical contact is advantageously riveted to the heating track by means of a work step in which the heating track is stamped out simultaneously.

BRIEF DESCRIPTION OF THE DRAWINGS

One exemplary embodiment of a filter device of the invention is described in further detail below in conjunction with the schematic drawings. Shown are.

DETAILED DESCRIPTION OF THE EXEMPLARY EMBODIMENT

Figure 1:
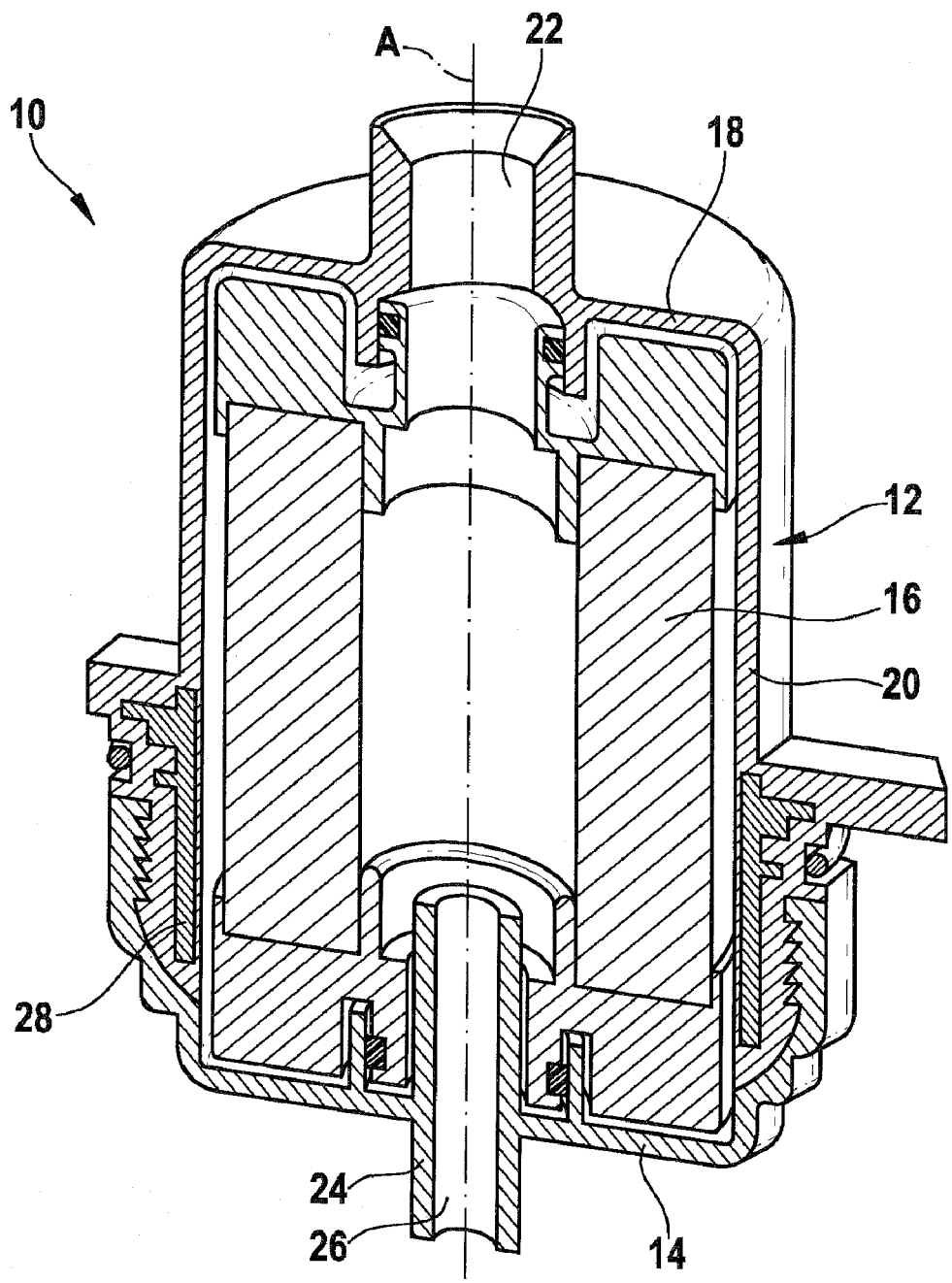
FIG. 1, a perspective view of a cross section through half of an exemplary embodiment of a filter device of the invention.
Figure 2:
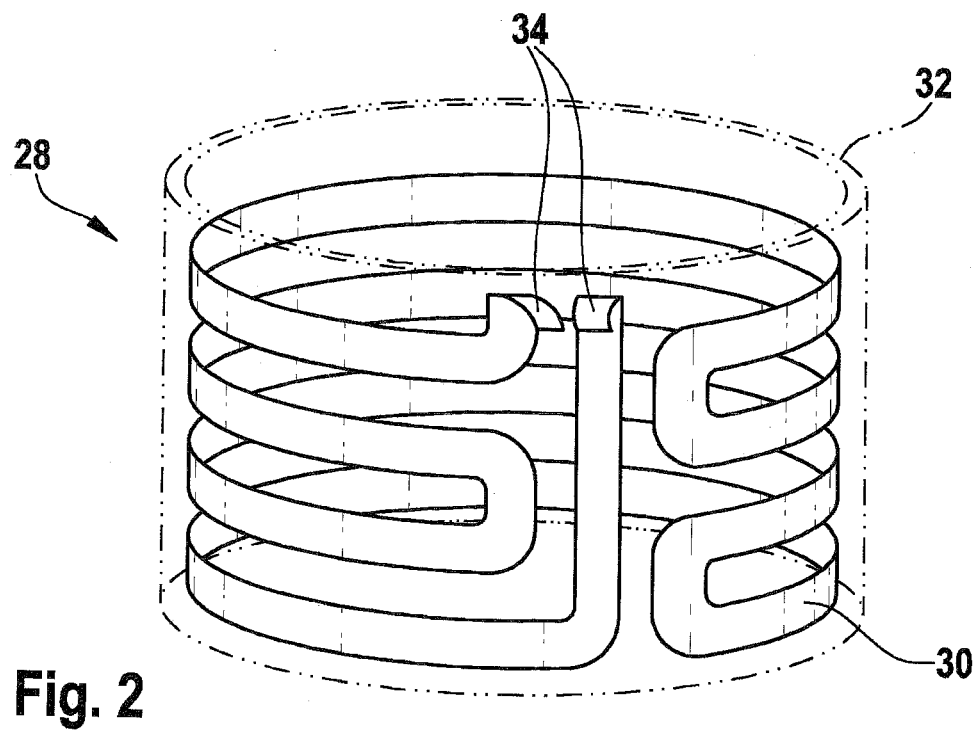
FIG. 2, a perspective view of a heating track of the filter device of FIG. 1.
Figure 3:
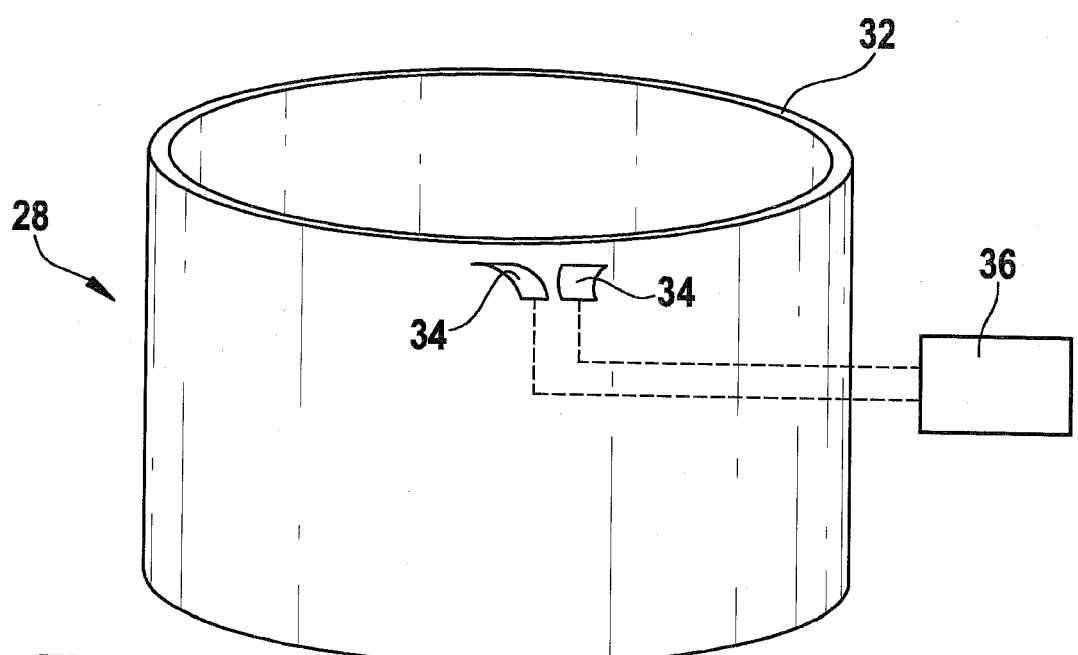
FIG. 3, a perspective view of the heating track, insert-molded in a retaining element, of FIG. 2.
Figure 4:
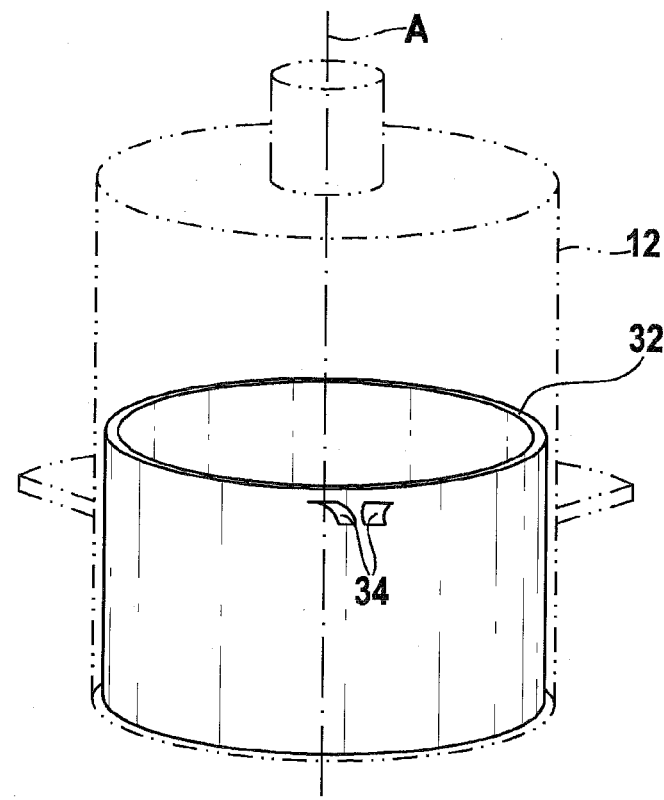
FIG. 4, a filter housing for a filter device of FIG. 1, with a retaining element machined into it along with a heating track in accordance with FIGS. 2 and 3.
Figure 5:
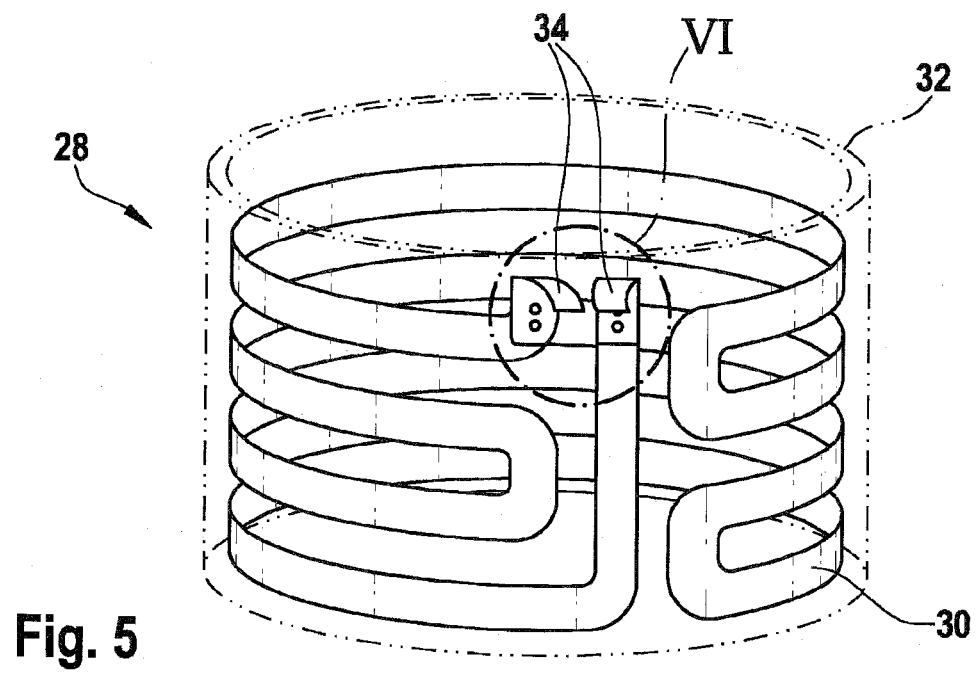
FIG. 5, a view as in FIG. 2 of a second exemplary embodiment of a heating track of the invention of a filter device, with electrical contacts riveted to it.
Figure 6:
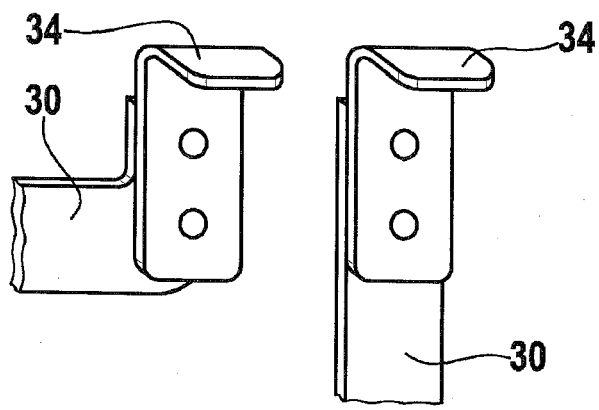
FIG. 6, an enlarged view of the detail VI in FIG. 5.
Figure 7:
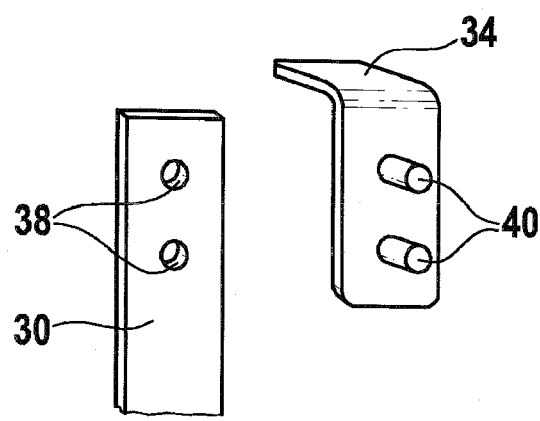
FIG. 7, a further-enlarged view of a heating track of FIG. 6 before the riveting.
Figure 8:
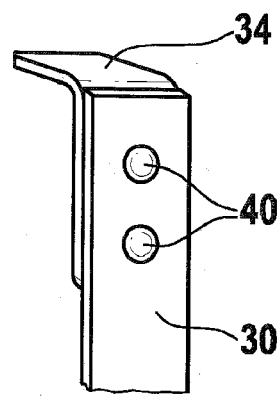
FIG. 8, the view of FIG. 7 after the riveting.

In the drawings, a filter device 10 is shown, which as its fundamental elements has a filter housing, composed of a housing cup 12 and a housing cap 14, and a filter element 16 located in the filter housing.

The housing cup 12 is embodied in its basic shape as a cup, which includes a housing bottom 18 and an annular wall 20 adjoining it on the circumference. The annular wall 20 is embodied essentially cylindrically about a longitudinal axis A. The housing bottom 18 is penetrated centrally by a through opening 22, which is used for connecting a sensor, not shown. Diametrically opposite in the housing cap 14, a mandrel 24 is embodied, with a through opening 26 penetrating it in the direction of the longitudinal axis A.

In operation of the filter device 10, a fluid or medium, such as fuel or urea, is introduced through this through opening 26 and subsequently passes from radially inside radially outward through the filter element 16 and leaves the filter device 10 through an outlet, not shown.

So that at especially low operating temperatures at the filter device 10 flaking, in particular, or freezing of the filtered fluid will not occur in or at the filter element 16, a heater 28 is disposed in the annular wall 20 of the housing cup 12, in its lower portion in terms of FIG. 1. In this heater 28, the heat generation is effected by means of a heating track 30 laid in loops, through which electrical current can be conducted.

The loops of the heating track 30, in the form of a so-called stamped grating, have been shaped from a sheet-metal strip by means of a stamping process and then bent into a ring. The heating track 30 is distributed over the jacket face of the annular wall 20 in such a way that a large-area and at the same time uniform input of thermal energy into the annular wall 20 and thus into the fluid flowing in it occurs.

The heating track 30, stamped out and preshaped in this way, of the heater 28 has moreover been injection-molded in a first injection-molding operation into a tubular retaining element 32 of plastic. The plastic comprising the retaining element 32 may be enriched with aluminum oxide or magnesium hydroxide and thus made highly thermally conductive. In the injection-molding operation, two contact points 34 on the heating track 30 have been extended out of the retaining element 32 in such a way that downstream of the retaining element, a control device 36, shown only highly simplified, for delivering and regulating electric current to the heating track 30 can be attached.

In a second injection-molding operation, the retaining element 32 has then been embedded together with the heating track 30 located in it into the aforementioned annular wall 20 of the housing cup 12. In the process, the retaining element 32 has been insert-molded once again, in particular preferably with a highly thermally conductive plastic, and the housing cup 12 was produced simultaneously. After that, the contact points 34 protrude out of the housing cup 12 for attachment of the control device 36.

In FIGS. 5 through 8, an exemplary embodiment of a heater 28 according to the invention is shown with a heating track 30 which is likewise injection-molded into a retaining element 32, and in which moreover electrical contact points or contacts 34 protrude out of the material comprising the retaining element 32.

However, in this exemplary embodiment, the electrical contact points 34 are not embodied in one piece or integrally with the material comprising the heating track 30, but instead are each embodied as a separate contact lug that is riveted to the end region of the heating track 30. The rivet connection is in each case embodied in rivetless fashion by means of two openings 38, in the form of bores, located in line with one another in the longitudinal direction of the heating track 30 on the end region of the heating track 30, and a projection 40 in the form of a pin embodied on the associated electrical contact 34 is inserted into each of these openings or bores and riveted.

The invention claimed is:

1. A liquid filter device, comprising:
a filter housing;
a filter element located in said filter housing;
a heater for heating a medium flowing through the filter device and including at least one metal stamped grating heating track; and
an electrical contact provided in at least one end region of said at least one metal stamped grating heating track and connected to said at least one metal stamped grating heating track via a connection, wherein said at least one end region of said at least one metal stamped grating heating track faces the electrical contact and has at least one opening, said electrical contact having a projection which is inserted and riveted in said at least one opening to form said connection.

2. A filter device as defined claim 1, wherein said electrical contact extends out of a material of said filter housing.

3. A filter device as defined in claim 1, wherein said electrical contact is composed of a different material than said metal stamped grating heating track.

4. A filter device as defined in claim 1, wherein said metal stamped grating heating track is composed of a purposefully high-impedance material, said electrical contact being composed of a purposefully low-impedance material.

5. A filter device as defined in claim 1, wherein said electrical contact is formed as a contact which is connected to said metal stamped grating heating track by work step in which said metal stamped grating heating track is simultaneously stamped out.

6. A filter device as defined in claim 1, wherein said at least one metal stamped grating heating track (30) is distributed in loop-shaped fashion in a surface of said filter housing.

7. A filter device as defined in claim 1, wherein said at least one metal stamped grating heating track is positioned in a retaining element which is insert-molded with a material of said filter housing.

8. A filter device as defined in claim 7, wherein said retaining element is composed of a highly thermally conductive plastic.

9. A filter device as defined in claim 1, wherein said at least one metal stamped grating heating track is located substantially on an inside of said filter housing.

10. A filter device as defined in claim 1, wherein said metal stamped grating heating track is formed as a track injection-molded in said filter housing.

11. A filter device as defined in claim 1, wherein said filter housing is cylindrical, and said at least one metal stamped grating heating track is located in a jacket portion of said cylindrical filter housing.

12. A filter device as defined in claim 1, further comprising a control device providing a control delivery of an electrical energy to said at least one metal stamped grating heating track.

* * * * *